(12) United States Patent
Shimizu (10) Patent No.: US 9,372,099 B2
(45) Date of Patent: *Jun. 21, 2016

(54) ANGLE MEASURING METHOD AND ANGLE MEASURING SYSTEM

(71) Applicant: Tokyo Seimitsu Co., Ltd., Hachioji-shi, Tokyo (JP)

(72) Inventor: Toru Shimizu, Tsuchiura (JP)

(73) Assignee: Tokyo Seimitsu Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/750,643

(22) Filed: Jun. 25, 2015

(65) Prior Publication Data
US 2015/0292914 A1      Oct. 15, 2015

Related U.S. Application Data

(63) Continuation of application No. 13/856,061, filed on Apr. 3, 2013, now Pat. No. 9,134,145.

(51) Int. Cl.
| | |
|---|---|
| *G01B 11/02* | (2006.01) |
| *G01D 5/26* | (2006.01) |
| *G01D 5/244* | (2006.01) |
| *G01D 5/30* | (2006.01) |

(52) U.S. Cl.
CPC ............ *G01D 5/266* (2013.01); *G01D 5/24485* (2013.01); *G01D 5/30* (2013.01)

(58) Field of Classification Search
CPC . G01D 5/266; G01D 5/3473; G01D 5/34738; G01B 11/26
USPC .......................................................... 356/498
See application file for complete search history.

(56) References Cited

U.S. PATENT DOCUMENTS

| | | |
|---|---|---|
| 4,044,610 A | 8/1977 | Oldaeus et al. |
| 5,237,390 A | 8/1993 | Chaney |
| 5,341,702 A | 8/1994 | Chaney et al. |

(Continued)

FOREIGN PATENT DOCUMENTS

| | | |
|---|---|---|
| DE | 2605139 A1 | 9/1976 |
| EP | 2447677 A2 | 5/2012 |

(Continued)

OTHER PUBLICATIONS

International Search Report, mailed Apr. 2, 2013, issued in PCT/JP2013/053215, 11 pages in English and Japanese.

(Continued)

*Primary Examiner* — Jonathan Hansen
(74) *Attorney, Agent, or Firm* — Sughrue Mion, PLLC (57) ABSTRACT

An angle measuring system including: a rotary encoder including an encoder main body and a rotating shaft which is freely rotatable with respect to the encoder main body, the rotary encoder which detects a relative rotation angle of the rotating shaft with respect to the encoder main body; a regulation member which regulates an absolute rotation angle of the encoder main body about the rotating shaft within a fixed range; an absolute angle detecting device which detects the absolute rotation angle of the encoder main body about the rotating shaft concurrently with detection of the relative rotation angle by the rotary encoder; and a correction device which corrects the rotation angle detected by the rotary encoder based on the rotation angle detected by the absolute angle detecting device.

7 Claims, 8 Drawing Sheets

(56) References Cited

U.S. PATENT DOCUMENTS

| | | | |
|---|---|---|---|
| 5,508,806 | A | 4/1996 | Dowdy et al. |
| 5,969,817 | A | 10/1999 | Ohsawa |
| 6,008,901 | A | 12/1999 | Ohtsuka |
| 2008/0148808 | A1 | 6/2008 | Vasiloiu |
| 2008/0149816 | A1* | 6/2008 | Wang et al. ............ 250/231.18 |

FOREIGN PATENT DOCUMENTS

| | | | |
|---|---|---|---|
| JP | 2272310 | A | 11/1990 |
| JP | 3128815 | U | 12/1991 |
| JP | 5500864 | A | 2/1993 |
| JP | 6502727 | A | 3/1994 |
| JP | 95080 | A | 1/1997 |
| JP | 9243336 | A | 9/1997 |
| JP | 10118894 | A | 5/1998 |
| JP | 11132752 | A | 5/1999 |
| JP | 2000275030 | A | 10/2000 |
| JP | 2005292037 | A | 10/2005 |
| JP | 2006047093 | A | 2/2006 |
| JP | 2007333712 | A | 12/2007 |
| JP | 2008145299 | A | 6/2008 |
| JP | 2012093252 | A | 5/2012 |
| JP | 2013079978 | A | 5/2013 |
| NL | 1033040 | C2 | 6/2008 |
| WO | 9119958 | A1 | 12/1991 |
| WO | 9305360 | A1 | 3/1993 |

OTHER PUBLICATIONS

Written Opinion, dated Jul. 23, 2013, issued in PCT/JP2013/053215, 7 pages in Japanese only.
Written Opinion, dated Feb. 4, 2014, issued in PCT/JP2013/053215, 9 pages in Japanese only.
International Preliminary Report on Patentability (Chapter II), mailed Aug. 21, 2014, issued in related PCT/JP2013/053215, 15 pages in English and Japanese.
The Explanation of Circumstances Concerning Accelerated Examination, dispatched Jan. 25, 2013, issued in JP Application No. 2013-10062, 6 pages in English and Japanese.
Notification of Reasons for Rejection, dated Oct. 27, 2014, issued in JP 2013-558688 (JP National Stage of PCT/JP2013/053215), 6 pages in English and Japanese.
The Explanation of Circumstances Concerning Accelerated Examination, dated Mar. 8, 2013, issued in related JP Application No. 2013-044319, 8 pages in English and Japanese.
Notification of Reasons for Rejection, dated Apr. 1, 2013, issued in related JP Application No. 2013-044319, 4 pages in English and Japanese.
Notification of Reasons for Rejection, dated May 29, 2013, issued in corresponding JP Application No. 2013-044319, 9 pages in English and Japanese.
Cui et al., "Development of Measuring Method for Positioning Accuracy of Tilting Axes in Five-Axis Machining Centers—Development of Clinometer using a Rotary Encoder and a Level," Precision Engineering Journal (CD-ROM), Sep. 5, 2007, vol. 73, No. 9, pp. 1040-1045.
Decision of Refusal, dated Jul. 25, 2013, issued in related JP Application No. 2013-044319, 6 pages in English and Japanese.
Communication, dated Apr. 25, 2014, issued in corresponding EP Application No. 11186603.4, 7 pages in English.
Office Action for JP 2010-241173 dated Aug. 7, 2012, 7 pages in English and Japanese.
Office Action for JP 2012-230847 dated Nov. 12, 2012, 9 pages in English and Japanese.
Explanation of circumstances concerning accelerated examination for JP 2010-241173 dated Jul. 20, 2012, 5 pages in English and Japanese.
Explanation of circumstances concerning accelerated examination for JP 2012-230847 dated Oct. 19, 2012, 9 pages in English and Japanese.
Communication, dated Jun. 29, 2015, issued in related EP Application No. 15152832.0, 3 pages.
Communication pursuant to Article 94(3) EPC, dated Jul. 3, 2015, issued in related EP Application No. 15 152 832.0, 5 pages.
Communication, dated Jul. 15, 2015, issued in related EP Application No. 15156327.7, 3 pages.
Communication pursuant to Article 94(3) EPC, dated Aug. 13, 2015, issued in corresponding EP Application No. 11 186 603.4, 9 pages in English.

* cited by examiner

ANGLE MEASURING METHOD AND ANGLE MEASURING SYSTEM

The present application is a continuation of U.S. application Ser. No. 13/856,061, filed Apr. 3, 2013, that is incorporated herein by reference in its entirety.

BACKGROUND OF THE INVENTION

1. Field of the Invention

The present invention relates to an angle measuring method and an angle measuring system, which can be suitably used in a technical field that requires accurate measurement of the rotation angle of a rotor.

2. Description of the Related Art

In order to accurately measure indexing accuracy of a rotor in a machine tool or the like, an angle measuring method using a polygon mirror and an autocollimator (hereinafter referred to as a "polygon mirror method") or an angle measuring method using a Hirth coupling and a laser interferometer (hereinafter referred to as a "Hirth coupling method") has conventionally been performed.

The polygon mirror method includes measuring a difference between the rotation angle of an object to be measured on which a polygon mirror is mounted and the angle of the polygon mirror by a high-accuracy autocollimator.

The Hirth coupling method includes rotating an object to be measured to which a Hirth coupling is attached to be a predetermined target angular displacement, counter-rotating the Hirth coupling by an amount corresponding to the target angular displacement after decoupling the Hirth coupling, and comparing the sum of the counter-angular displacement of the Hirth coupling and an angular displacement from a reference position which is measured by a laser interferometer with the target angular displacement of the object to be measured (Japanese National Publication of International Patent Application No. 1994-502727).

SUMMARY OF THE INVENTION

However, the conventional angle measuring techniques suffer from the disadvantages of longer measurement and the difficulty of improving measurement accuracy.

In the polygon mirror method, measurement is repeated while the phase angle between the angle of the polygon mirror and that of an object to be measured is varied. Indexing is manually performed by an operator, which requires a measurer to continue measurement work under tension for a long time without a break. Additionally, because of low resolution and the difficulty of keeping an apparatus stable for a long time, there is a limitation to improvement in measurement accuracy.

The Hirth coupling method requires the oscillating operation of rotating an object to be measured to a target angular displacement and then returning a reflecting mirror of a laser interferometer to the original position by counter-rotating the Hirth coupling by an amount corresponding to the target angular displacement, which results in longer overall measurement time. Additionally, since the accuracy of angle measurement depends on the resolution of gear teeth of the Hirth coupling, and a transmission error occurs in the gear teeth of the Hirth coupling when forward rotation and reverse rotation are repeated, there is a limitation to improvement in measurement accuracy.

A rotary encoder is known as a device which detects a rotation angle. Although a rotary encoder needs to be attached to a rotating shaft of an object to be measured with high accuracy in order to bring measurement accuracy within a tolerable range, actual high-accuracy attachment of a rotary encoder is not very easy. This hinders utilization of a rotary encoder.

The present invention has been made in consideration of the above-described circumstances, and aims to provide an angle measuring method and an angle measuring apparatus capable of measuring a rotation angle with high accuracy in a short time.

In order to achieve the above-described object, according to the present invention, there is provided an angle measuring method using a rotary encoder including a body section, a rotating shaft which is freely rotatable with respect to the body section, a code section attached to the rotating shaft, and a read section fixed to the body section which reads a code of the code section, the angle measuring method including: regulating a displacement of a body section of the rotary encoder in a plane orthogonal to a rotating shaft of the rotary encoder within a fixed allowance range so as to tolerate eccentricity between a rotating shaft of an object to be measured which is rotationally driven and a rotating shaft of the rotary encoder attached to the rotating shaft of the object to be measured; measuring a rotation angle of the rotating shaft of the rotary encoder based on a code read by the read section of the rotary encoder; detecting a changed angle of the body section of the rotary encoder, the changed angle being an angle changed from a time point when measurement of the rotation angle of the rotating shaft of the rotary encoder is started; and correcting the rotation angle measured using the rotary encoder based on the detected changed angle of the body section of the rotary encoder. With this configuration, a measurement value from the rotary encoder is corrected with a changed angle of the body section of the rotary encoder. The rotation angle can thus be measured with higher accuracy in a shorter time than a conventional angle measuring technique using the polygon mirror method or the Hirth coupling method. Additionally, a tolerable range for the amount of eccentricity between the rotating shaft of the rotary encoder and the rotating shaft of the object to be measured can be made broader than a tolerable range specified for the rotary encoder, which makes attachment of the rotary encoder to the object to be measured much easier. That is, according to the present invention, rotation angle measurement can be performed with high accuracy in a short time using a rotary encoder, which contributes greatly to an increase in the production capacity of a machine tool or the like.

According to one aspect of the present invention, in the method, the regulating of displacement of the body section of the rotary encoder within the fixed allowance range is performed using a jig which locks the body section of the rotary encoder while tolerating the displacement of the body section of the rotary encoder within the fixed allowance range.

According to one aspect of the present invention, the method further including urging the body section of the rotary encoder in a gravity direction using a weight is attached to the body section of the rotary encoder.

Further, according to the present invention, there is also provided an angle measuring method using a rotary encoder including a body section, a rotating shaft which is freely rotatable with respect to the body section, a code section attached to the rotating shaft, and a read section fixed to the body section which reads a code of the code section, the angle measuring method including: regulating a displacement of a body section of the rotary encoder in a plane orthogonal to a rotating shaft of the rotary encoder within a fixed allowance range so as to tolerate eccentricity between a rotating shaft of an object to be measured which is rotationally driven and a rotating shaft of the rotary encoder attached to the rotating shaft of the object to be measured; measuring a rotation angle of the rotating shaft of the rotary encoder based on a code read by the read section of the rotary encoder; detecting a changed angle of the rotating shaft of the rotary encoder, the changed angle being an angle changed from a time point when measurement of the rotation angle of the body section of the rotary encoder is started; and correcting the rotation angle measured using the rotary encoder based on the detected changed angle of the rotating shaft of the rotary encoder. With this configuration, a measurement value from the rotary encoder is corrected with a changed angle of the body section of the rotary encoder. The rotation angle can thus be measured with higher accuracy in a shorter time than a conventional angle measuring technique using the polygon mirror method or the Hirth coupling method. Additionally, a tolerable range for the amount of eccentricity between the rotating shaft of the rotary encoder and the rotating shaft of the object to be measured can be made broader than a tolerable range specified for the rotary encoder, which makes attachment of the rotary encoder to the object to be measured much easier. That is, according to the present invention, rotation angle measurement can be performed with high accuracy in a short time using a rotary encoder, which contributes greatly to an increase in the production capacity of a machine tool or the like.

According to one aspect of the present invention, in the method, the regulating of displacement of the body section of the rotary encoder within the fixed allowance range is performed using a jig which locks the rotating shaft of the rotary encoder while tolerating the displacement of the rotating shaft of the rotary encoder within the fixed allowance range.

According to one aspect of the present invention, the method further including urging the rotating shaft of the rotary encoder in a gravity direction using a weight attached to the rotating shaft of the rotary encoder.

According to the present invention, there is also provided an angle measuring system including: a rotary encoder including a body section, a rotating shaft which is freely rotatable with respect to the body section, the rotating shaft being attached to an object to be measured which is rotationally driven, a code section attached to the rotating shaft, and a read section fixed to the body section which reads a code of the code section; a regulation member which regulates displacement of the body section of the rotary encoder in a plane orthogonal to the rotating shaft of the rotary encoder to within a fixed allowance range so as to tolerate eccentricity of the rotating shaft of the object to be measured from the rotating shaft of the rotary encoder; a non-contact angle detecting device which detects, in a non-contact manner, a changed angle of the body section of the rotary encoder, the changed angle being an angle changed from a time point when measurement of the rotation angle of the rotating shaft of the rotary encoder is started; and a correction device which corrects a rotation angle corresponding to a code read by the read section of the rotary encoder on the basis of the changed angle of the body section of the rotary encoder detected by the non-contact angle detecting device.

In one aspect of the present invention, the regulation member includes a jig which locks the body section of the rotary encoder while tolerating the displacement of the body section of the rotary encoder within the fixed allowance range.

In one aspect of the present invention, the regulation member includes a weight which is attached to the body section of the rotary encoder to urge the body section of the rotary encoder in a gravity direction.

According to the present invention, there is also provided an angle measuring system including: a rotary encoder including a body section, a rotating shaft which is freely rotatable with respect to the body section, the rotating shaft being attached to an object to be measured which is rotationally driven, a code section attached to the rotating shaft, and a read section fixed to the body section which reads a code of the code section; a regulation member which regulates displacement of the rotating shaft of the rotary encoder in a plane orthogonal to the rotating shaft of the rotary encoder to within a fixed allowance range so as to tolerate eccentricity between the rotating shaft of the object to be measured and the rotating shaft of the rotary encoder; a non-contact angle detecting device which detects, in a non-contact manner, a changed angle of the rotating shaft of the rotary encoder, the changed angle being an angle changed from a time point when measurement of the rotation angle of the body section of the rotary encoder is started; and a correction device which corrects a rotation angle corresponding to a code read by the read section of the rotary encoder on the basis of the changed angle of the rotating shaft of the rotary encoder detected by the non-contact angle detecting device.

According to one aspect of the present invention, the regulation member includes a jig which locks the rotating shaft of the rotary encoder while tolerating the displacement of the rotating shaft of the rotary encoder within the fixed allowance range.

According to one aspect of the present invention, the regulation member includes a weight which is attached to the rotating shaft of the rotary encoder to urge the rotating shaft of the rotary encoder in a gravity direction.

According to one aspect of the present invention, the non-contact angle detecting device includes first and second reflector elements set on the plane orthogonal to the rotating shaft of a part of the rotary encoder which is regulated by the regulation member, a laser light source, an interference optical system which splits a light beam emitted from the laser light source into a first light beam heading toward the first reflector element and a second light beam heading toward the second reflector element and causing a first reflected light beam reflected from the first reflector element and a second reflected light beam reflected from the second reflector element to interfere with each other, a phase difference detecting device which detects a phase difference between the first reflected light beam and the second reflected light beam caused by the interference optical system to interfere with each other, and an inclination angle calculating device which calculates an inclination angle of a straight line connecting corresponding points of the first reflector element and second reflector element on the basis of the phase difference between the first reflected light beam and the second reflected light beam detected by the phase difference detecting device and a difference in position between the first reflector element and the second reflector element.

According to one aspect of the present invention, the correction device figures out the sum of the rotation angle corresponding to the code read by the read section of the rotary encoder and the inclination angle calculated by the inclination angle calculating device.

According to one aspect of the present invention, the non-contact angle detecting device performs at least one of static measurement, in which the rotation angle is detected when rotation of the rotating shaft of the object to be measured is stopped, and dynamic measurement, in which the rotation angle is detected while the rotating shaft of the object to be measured is rotating.

The present invention allows measurement of a rotation angle with higher accuracy in a shorter time than the prior art.

The present invention also makes attachment of a rotary encoder to an object to be measured much easier.

DETAILED DESCRIPTION OF THE PREFERRED EMBODIMENTS

Embodiments of the present invention will be described below with reference to the accompanying drawings.

Figure 1:
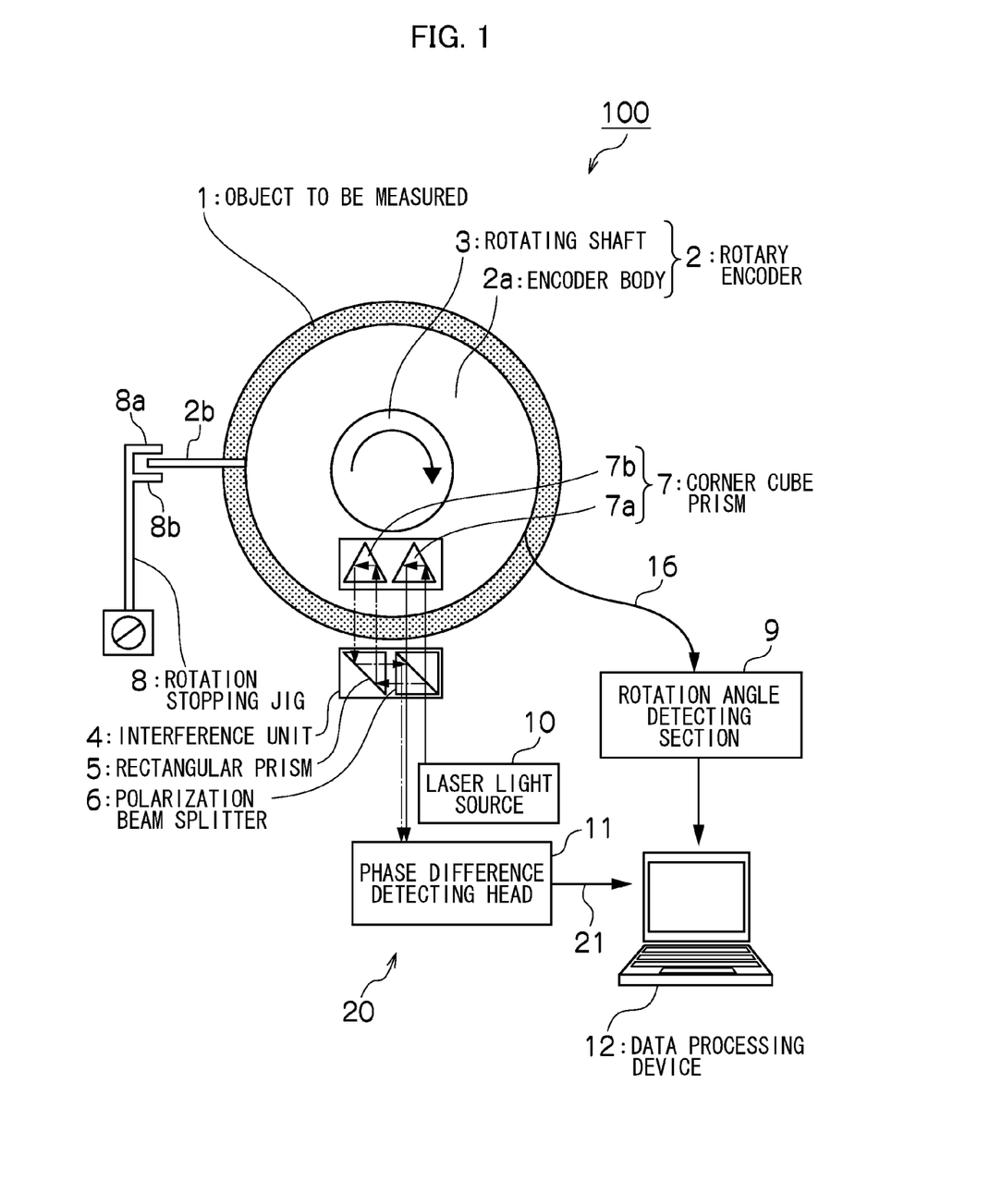
FIG. 1 is a view of the overall configuration of an example of an angle measuring system according to a first embodiment.

FIG. 1 is a view of the overall configuration of an example of an angle measuring system according to a first embodiment.

An angle measuring system 100 shown in FIG. 1 measures, using a rotary encoder 2, the rotation angle of a rotating shaft 1a of an object 1 to be measured which is rotationally driven. The rotary encoder 2 includes an encoder body 2a and a rotating shaft 3 which is freely rotatable with respect to the encoder body 2a.

Figure 2:
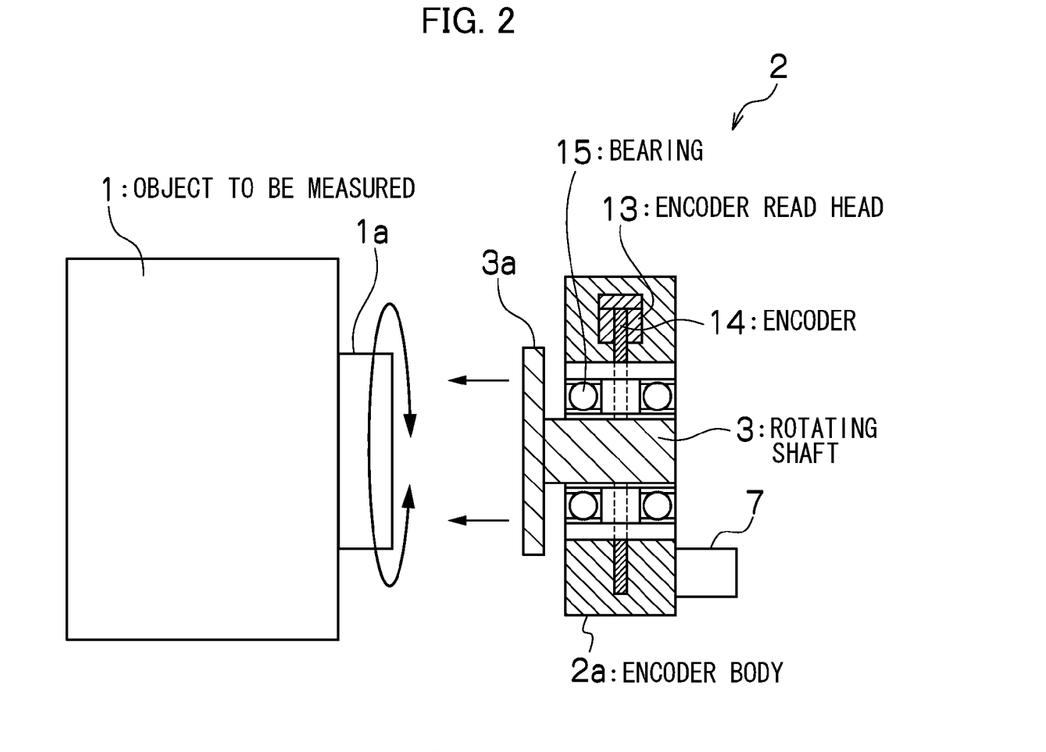
FIG. 2 is a side view showing how a rotating shaft of a rotary encoder is attached to an object to be measured which is rotationally attached.
Figure 3:
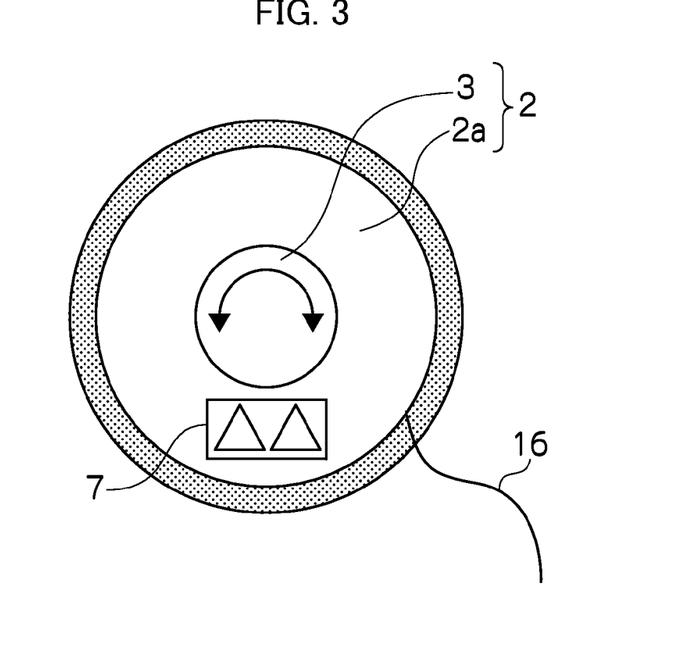
FIG. 3 is a front view showing how the rotating shaft of the rotary encoder is attached to the object to be measured which is rotationally attached.

FIG. 2 is a side view showing how the rotating shaft 3 of the rotary encoder 2 is attached to the rotating shaft 1a of the object 1 to be measured, and FIG. 3 is a front view thereof.

As shown in FIG. 2, a disc-like encoder 14 (code section) is attached to the rotating shaft 3 inside the encoder body 2a. Graduations (codes) are marked on the entire circumference about the rotating shaft 3 of the encoder 14. The encoder 14 may be of the incremental type or of the absolute type. An encoder read head 13 (read section) which reads a graduation of the encoder 14 is fixed to the encoder body 2a. The encoder read head 13 outputs a pulse signal (rotation angle signal) corresponding to a read graduation of the encoder 14. That is, a pulse signal corresponding to a variation in the rotation angle of the encoder body 2a relative to the rotating shaft 3 is generated by the rotary encoder 2. Note that the encoder body 2a may be of the coupling-containing type.

The rotating shaft 3 of the rotary encoder 2 is attached to the encoder body 2a via a bearing 15 which is composed of, for example, a ball bearing. In the present embodiment, the rotating shaft 3 of the rotary encoder 2 is removably attached to the rotating shaft 1a of the object 1 to be measured. After the attachment, the rotating shaft 3 is freely rotatable with respect to the encoder body 2a via the bearing 15. For this reason, even if the rotating shaft 1a of the object 1 to be measured rotates, a cable 16 which is connected to the rotary encoder body 2a does not twine around the object 1 to be measured. The rotating shaft 3 according to the present embodiment includes an attaching section 3a to be attached to the rotating shaft 1a of the object 1 to be measured. The rotating shaft 3 may be attached to the rotating shaft 1a of the object 1 to be measured via a special attachment.

The encoder body 2a according to the present embodiment is arranged in a state in which motion (displacement) in a plane orthogonal to the rotating shaft 3 (hereinafter referred to as an "orthogonal plane") is tolerated within a fixed allowance range so as to tolerate eccentricity of the rotating shaft 1a of the object 1 to be measured from the rotating shaft 3 of the rotary encoder 2, as will be described later. A tolerable range for the amount of eccentricity of the rotating shaft 3 of the rotary encoder 2 from the rotating shaft 1a of the object 1 to be measured depends on attachment tolerances of a non-contact angle detecting device 20 (to be described later). Accordingly, the tolerable range for the amount of eccentricity is broader than a tolerable range specified for the rotary encoder 2, which makes attachment of the rotary encoder 2 to the object 1 to be measured much easier. Although an axial runout of the object 1 to be measured does not cause a measurement error, a side runout may cause a measurement error. A side runout is kept at or below a specified value which is calculated to suit target measurement accuracy.

The non-contact angle detecting device 20 includes an interference unit 4 (a rectangular prism 5 and a polarization beam splitter 6), corner cube prisms 7 (7a and 7b), a laser light source 10, a phase difference detecting head 11, and a data processing device 12. The non-contact angle detecting device 20 detects, in a non-contact manner, the inclination angle of the encoder body 2a which is changed from a time point when measurement of the rotation angle of the rotating shaft 3 using the rotary encoder 2 is started. Note that the rotation angle measurement may be static measurement, in which the rotation angle is detected when rotation of the rotating shaft 1a of the object 1 to be measured is stopped, or dynamic measurement, in which the rotation angle is detected while the rotating shaft 1a of the object 1 to be measured is rotating. In static measurement, for example, a time point when rotation is started is a rotation angle measurement start point. In dynamic measurement, an arbitrary time point during rotation can be set as a rotation angle measurement start point.

Figure 4:
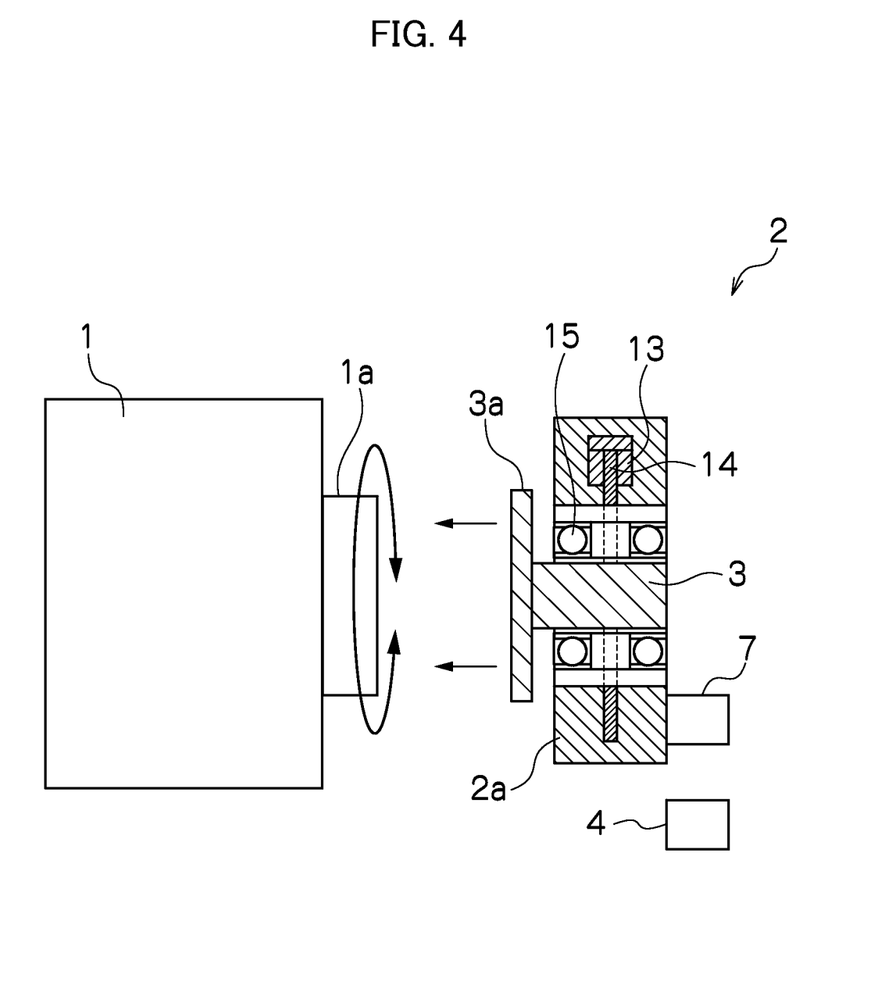
FIG. 4 is a side view showing how an interference unit of a non-contact angle detecting device is arranged to directly confront corner cube prisms.
Figure 5:
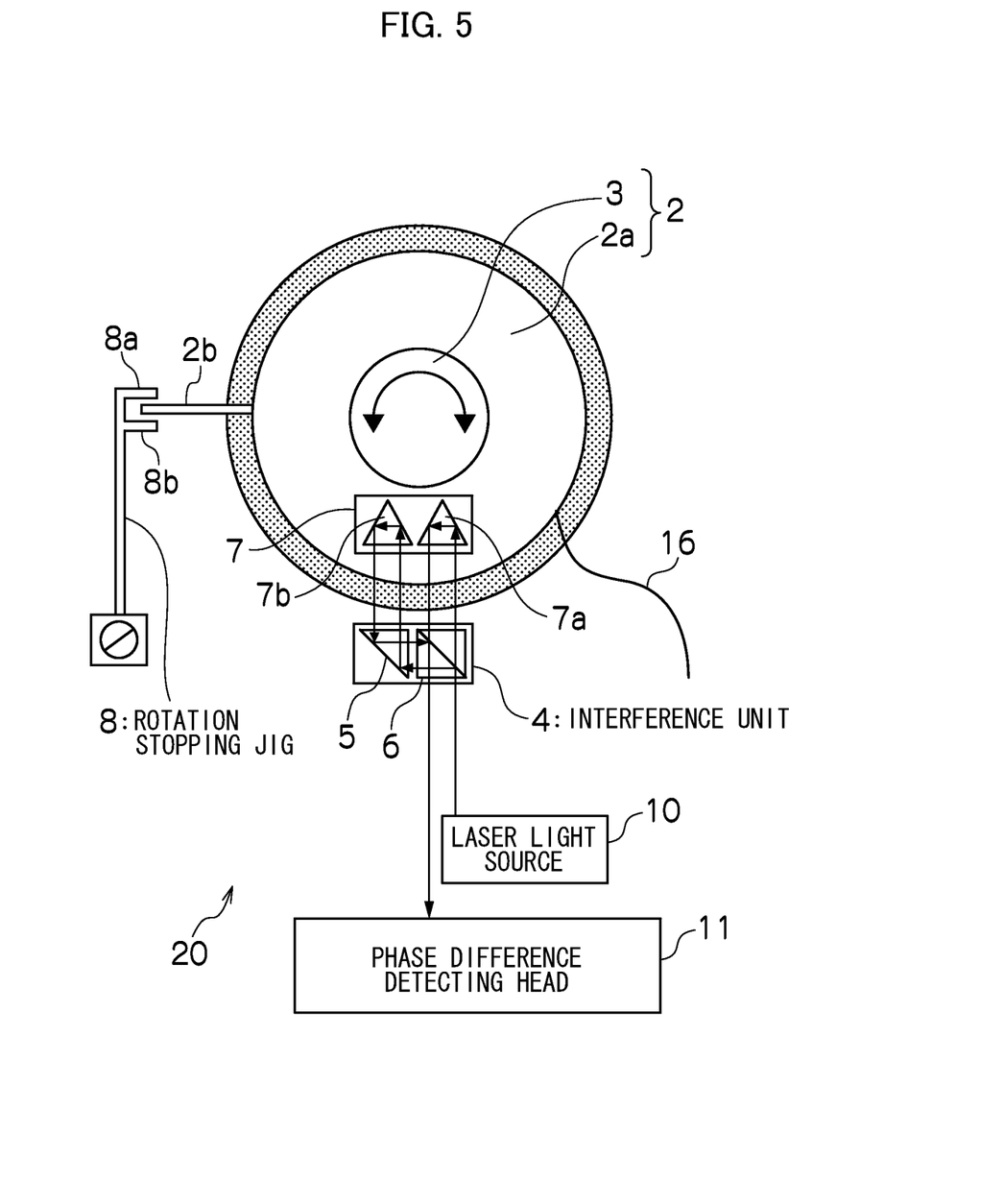
FIG. 5 is a front view showing how the interference unit of the non-contact angle detecting device is arranged to directly confront the corner cube prisms.

FIG. 4 is a side view showing how the interference unit 4 is arranged, and FIG. 5 is a front view thereof.

As shown in FIG. 5, the pair of corner cube prisms 7a and 7b (reflector elements) are set on the orthogonal plane (a plane orthogonal to the rotating shaft 3) of the encoder body 2a. The interference unit 4 (interference optical system) is arranged to directly confront the pair of corner cube prisms 7a and 7b.

As shown in FIG. 1, the interference unit 4 includes the rectangular prism 5 and polarization beam splitter 6. The interference unit 4 splits a laser light beam emitted from the laser light source 10 into a first laser light beam heading toward the first corner cube prism 7a and a second laser light beam heading toward the second corner cube prism 7b. The first laser light beam having passed through the polarization beam splitter 6 directly strikes the first corner cube prism 7a. The first laser light beam (first reflected laser light beam) reflected by the first corner cube prism 7a returns directly to the polarization beam splitter 6. The second laser light beam reflected at right angles by the polarization beam splitter 6 is further reflected at a right angle by the rectangular prism 5 and strikes the second corner cube prism 7b. The second laser light beam (second reflected light beam) reflected by the second corner cube prism 7b is reflected at right angles by the rectangular prism 5 and returns to the polarization beam splitter 6. That is, the interference unit 4 causes the first and second laser light beams parallel to each other to strike the first and second corner cube prisms 7a and 7b, respectively, and causes the first and second reflected light beams that are reflected from the first and second corner cube prisms 7a and 7b and return to interfere with each other. Accordingly, interference fringes are generated from the first and second reflected light beams with different optical path lengths by the interference unit 4.

The polarization beam splitter 6 is arranged such that a part (the first laser light beam) of the laser light beam emitted from the laser light source 10 passes through the polarization beam splitter 6 to perpendicularly strike an entrance surface of the first corner cube prism 7a. The rectangular prism 5 is arranged such that the second laser light beam having passed through the rectangular prism 5 is parallel to the first laser light beam.

The phase difference detecting head 11 (phase difference detecting device) receives interfering light which is composed of the first reflected light beam and second reflected light beam with the different optical path lengths and detects the phase difference between the reflected light beams (the first and second reflected light beams) from the first and second corner cube prisms 7a and 7b. In the present embodiment, the optical length difference (phase difference) between the length of the optical path of the first laser light beam (solid lines in FIG. 1) and that of the optical path of the second laser light beam (dotted lines in FIG. 1) is detected by counting the interference fringes.

Note that when the interference unit 4 directly confronts the corner cube prisms 7a and 7b, even if the corner cube prisms 7a and 7b move by about 1 mm in each of all of directions orthogonal to a laser light beam, a reduction in the amplitude of an interference signal measured by the phase difference detecting head 11 can be brought within a tolerable range. A tolerable range for the positional deviation depends on the beam diameter of the laser light source 10, the performance of the phase difference detecting head 11, and the like. The tolerable range for a positional displacement of each corner cube prism 7a or 7b is a tolerable range for the amount of eccentricity of the rotating shaft 1a from the rotating shaft 3, which makes attachment of the rotary encoder 2 much easier.

For example, a He—Ne laser is used as the laser light source 10. Even without wavelength stabilization, measurement accuracy is not much affected. Use of optical fibers for coupling the laser light source 10 and the interference unit 4 makes attachment work very easy. The phase difference detecting head 11 may adopt fringe counting technology (system) using a Michelson interferometer or heterodyne technology (system). If heterodyne technology is adopted, the laser light source 10 needs to emit orthogonally polarized two-frequency light. For example, a Zeeman laser or an AOM (acoustooptic element) is used.

The data processing device 12 includes a computer device such as a personal computer.

Figure 8:
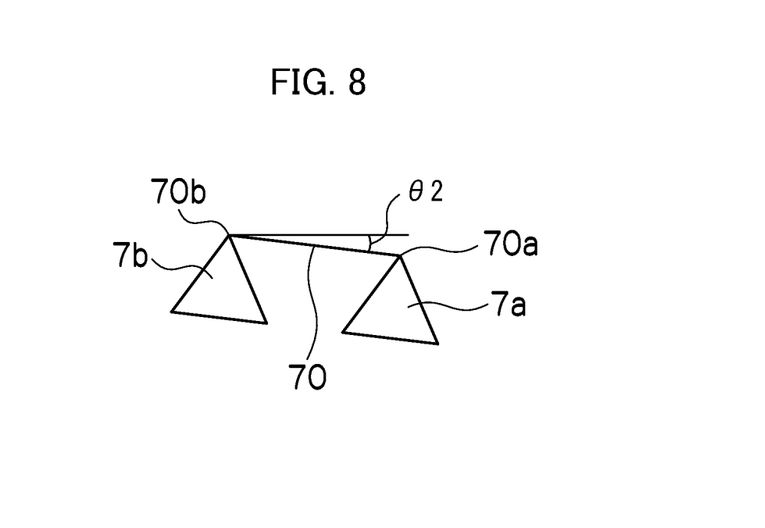
FIG. 8 is an explanatory view used to describe an angle to be detected by the non-contact angle detecting device.

The rotating shaft 1a of the object 1 to be measured is rotationally driven using a drive device (not shown) (e.g., a motor). A pulse signal (rotation angle signal) outputted from the rotary encoder 2 is sent to a rotation angle detecting section 9 via the cable 16. The rotation angle detecting section 9 converts the pulse signal into a rotation angle (hereinafter designated by reference characters "$\theta 1$") and sends the rotation angle $\theta 1$ to the data processing device 12. A phase difference signal indicating a phase difference (optical path length difference) between the first laser light beam and the second laser light beam outputted from the phase difference detecting head 11 is sent to the data processing device 12 via a cable 21. The data processing device 12 constitutes a part (inclination angle calculating device) of the non-contact angle detecting device 20 and calculates an inclination angle (hereinafter designated by reference characters "$\theta 2$") of a straight line 70 connecting a vertex 70a of the first corner cube prism 7a and a vertex 70b of the second corner cube prism 7b as shown in FIG. 8 using a trigonometric function on the basis of the phase difference signal outputted from the phase difference detecting head 11 and the difference in position (interval) between a vertex of the first corner cube prism 7a and a vertex of the second corner cube prism 7b. The inclination angle $\theta 2$ obtained from the non-contact angle detecting device 20 has a higher resolution (a smaller resolution pitch) than the rotation angle $\theta 1$ obtained from the rotary encoder 2 and rotation angle detecting section 9.

The data processing device 12 corrects the rotation angle $\theta 1$ (the rotation angle of the encoder body 2a relative to the rotating shaft 3) on the basis of the inclination angle $\theta 2$ (the inclination angle of a part of the rotary encoder 2 whose motion is regulated). That is, the data processing device 12 corrects the rotation angle $\theta 1$ that is measured using the rotary encoder 2 on the basis of the inclination angle $\theta 2$ of the straight line connecting the corresponding points of the corner cube prisms 7a and 7b. The data processing device 12 according to the present embodiment corrects the rotation angle $\theta 1$ by figuring out the sum of the angles $\theta 1$ and $\theta 2$ ($\theta 1+\theta 2$).

A specific example of a regulation member will be described.

In the example shown in FIGS. 1 and 5, motion of the encoder body 2a is regulated by a rotation stopping jig 8. In the rotation stopping jig 8, locking tabs 8a and 8b lock an extending rod 2b which is provided at the encoder body 2a. The width of a gap between the two locking tabs 8a and 8b corresponds to the tolerable range for the amount of eccentricity. With this configuration, motion of the encoder body 2a is regulated to at least within a measurable range for the non-contact angle detecting device 20.

In static measurement at measurement points, variations in measurement value from the rotary encoder 2 and non-contact angle detecting device 20 are required to be kept sufficiently smaller than required for target measurement accuracy. Static measurement is often performed at the time of measurement of indexing accuracy. In this case, the measurement is performed while rotation and suspension of rotation of the object to be measured are repeated for each fixed angle. In measurement value acquisition, measurement values are assumed to be sufficiently stable to the target measurement accuracy. The rotational speed of the object 1 to be measured depends especially on the performance of the rotary encoder 2 and non-contact angle detecting device 20, and measurement can be generally performed during high-speed rotation. Similarly, the measurement solution is generally more excellent than the method using a polygon mirror and an autocollimator (polygon mirror method), the method using a Hirth coupling and a laser interferometer (Hirth coupling method), and the like.

Note that if the performance of the bearing 15 is excellent, and the encoder body 2a is not made to rotate by rotation of the object 1 to be measured, the rotation stopping jig 8 may be omitted. That is, the bearing 15 itself can function as a regulation member which regulates motion of the encoder body 2a, depending on the performance of the bearing 15.

Figure 6:
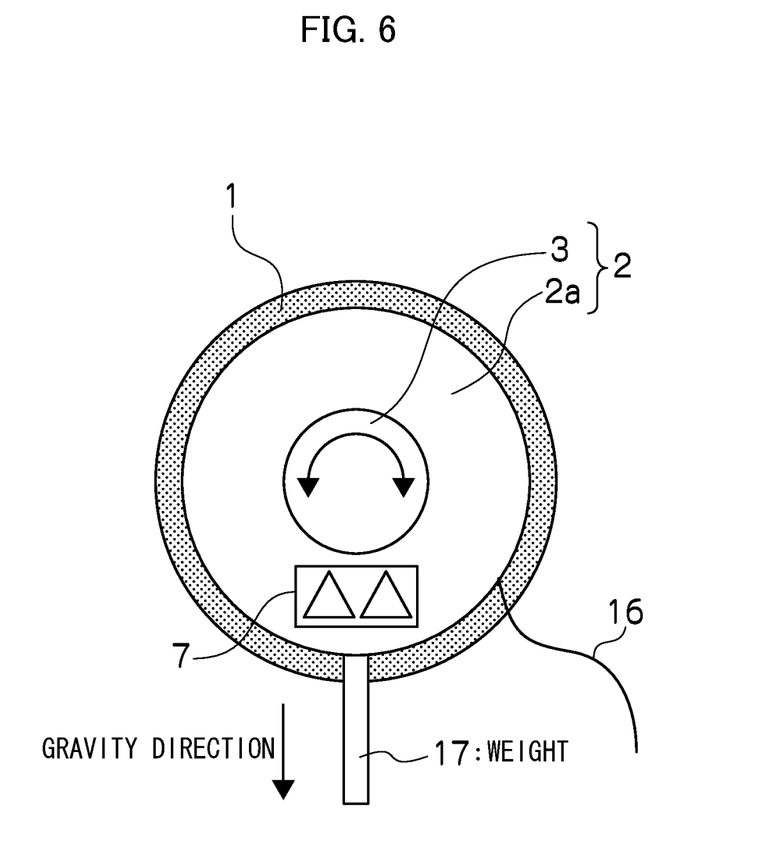
FIG. 6 is a front view showing an example of a case where displacement of an encoder body is regulated by a weight.

FIG. 6 is a front view showing a case where motion of the encoder body 2a is regulated by a weight 17. As shown in FIG. 6, the weight 17 is attached to the encoder body 2a and is hanged down in a gravity direction. The encoder body 2a is urged in the gravity direction by the weight 17, and motion of the encoder body 2a is regulated to within the fixed allowance range.

Figure 7:
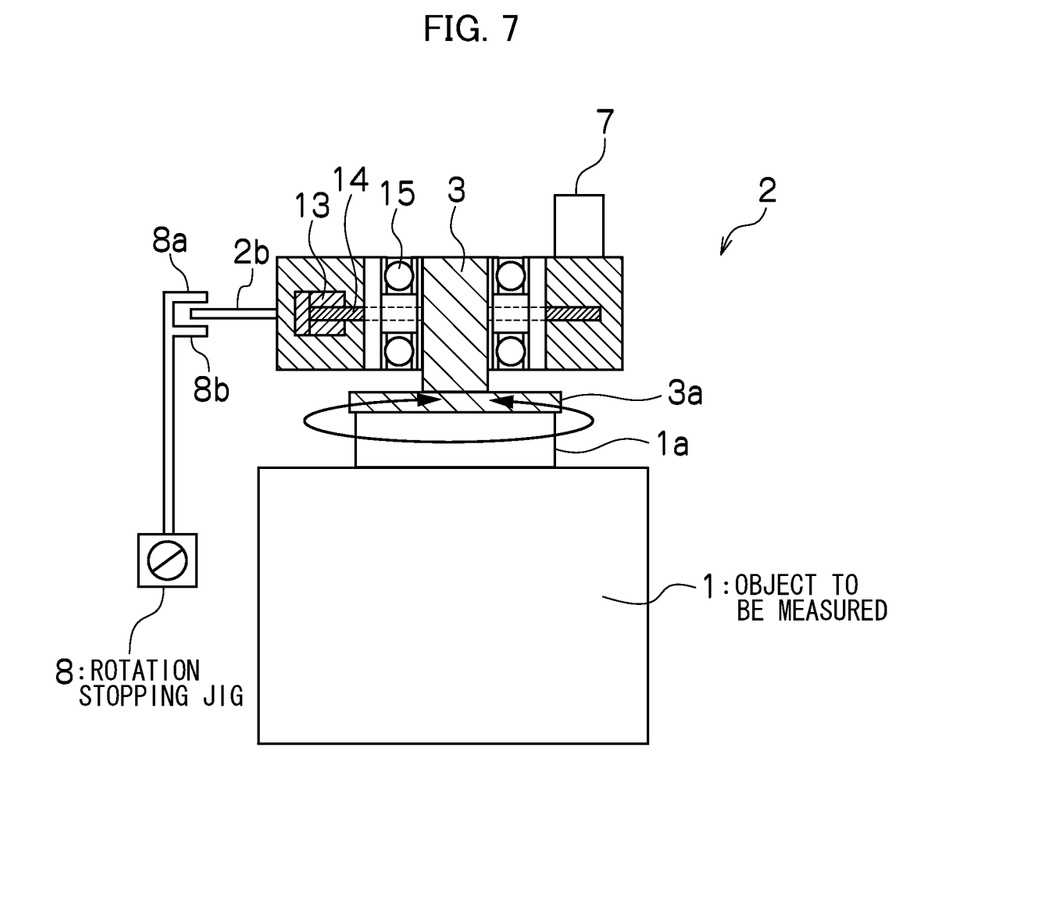
FIG. 7 is a side view showing a case where the object to be measured is arranged along a horizontal direction.

FIG. 7 is a side view showing a case where the object 1 to be measured is arranged along a horizontal direction.

If the rotation stopping jig 8 is weakly magnetized, the position of the encoder body 2a is easier to settle, and the measurement is easier. This case is especially effective in the case in FIG. 7 where the object 1 to be measured is horizontally arranged.

Note that although FIGS. 1 and 7 and the like show cases using the rotation stopping jig 8, and FIG. 6 shows a case using the weight 17, both may be used as regulation members. Alternatively, any other regulation member (e.g., a magnetic body which regulates motion by magnetic force) may be used.

As described above, in an angle measuring method according to the first embodiment, the rotating shaft 3 of the rotary encoder 2 is attached to the rotating shaft 1a of the object 1 to be measured that is rotationally driven, motion (displacement) of the rotary encoder body 2a in the orthogonal plane orthogonal to the rotating shaft 3 of the rotary encoder 2 is regulated to within the fixed allowance range so as to tolerate eccentricity of the rotating shaft 1a of the object 1 to be measured from the rotating shaft 3 of the rotary encoder 2. The rotation angle θ1 of the rotating shaft 3 of the rotary encoder 2 is detected (measured) on the basis of a code read by the encoder read head 13, and the inclination angle θ2 of the encoder body 2a changed from a time point when measurement of the rotation angle of the rotating shaft 3 of the rotary encoder 2 is started is detected by the non-contact angle detecting device 20. The rotation angle θ1 is corrected on the basis of the inclination angle θ2.

This configuration makes it possible to measure a rotation angle with high accuracy in a short time. More specifically, firstly, angle measurement using the rotary encoder 2 can omit manual work of an operator required for the conventional polygon mirror method and oscillation operation involving reverse rotation as in the Hirth coupling method. This allows not only high-accuracy measurement but also a reduction in overall measurement time. Secondly, since a measurement value from the rotary encoder 2 is corrected with a measurement value from the non-contact angle detecting device 20, further improved measurement accuracy can be achieved. Thirdly, since the tolerable range for the amount of eccentricity of the rotating shaft 3 of the rotary encoder 2 from the rotating shaft 1a of the object 1 to be measured can be made broader than the tolerable range specified for the rotary encoder 2, attachment of the rotary encoder 2 to the object 1 to be measured is much easier and requires a shorter time. For example, if the non-contact angle detecting device 20 is not concurrently used, an attachment accuracy of about 100 μm is required. If the non-contact angle detecting device 20 of the laser interferometric type is concurrently used, the required attachment accuracy can be lowered to about 1 mm, which results in extension of the tolerable range for the amount of eccentricity.

Second Embodiment

Figure 9:
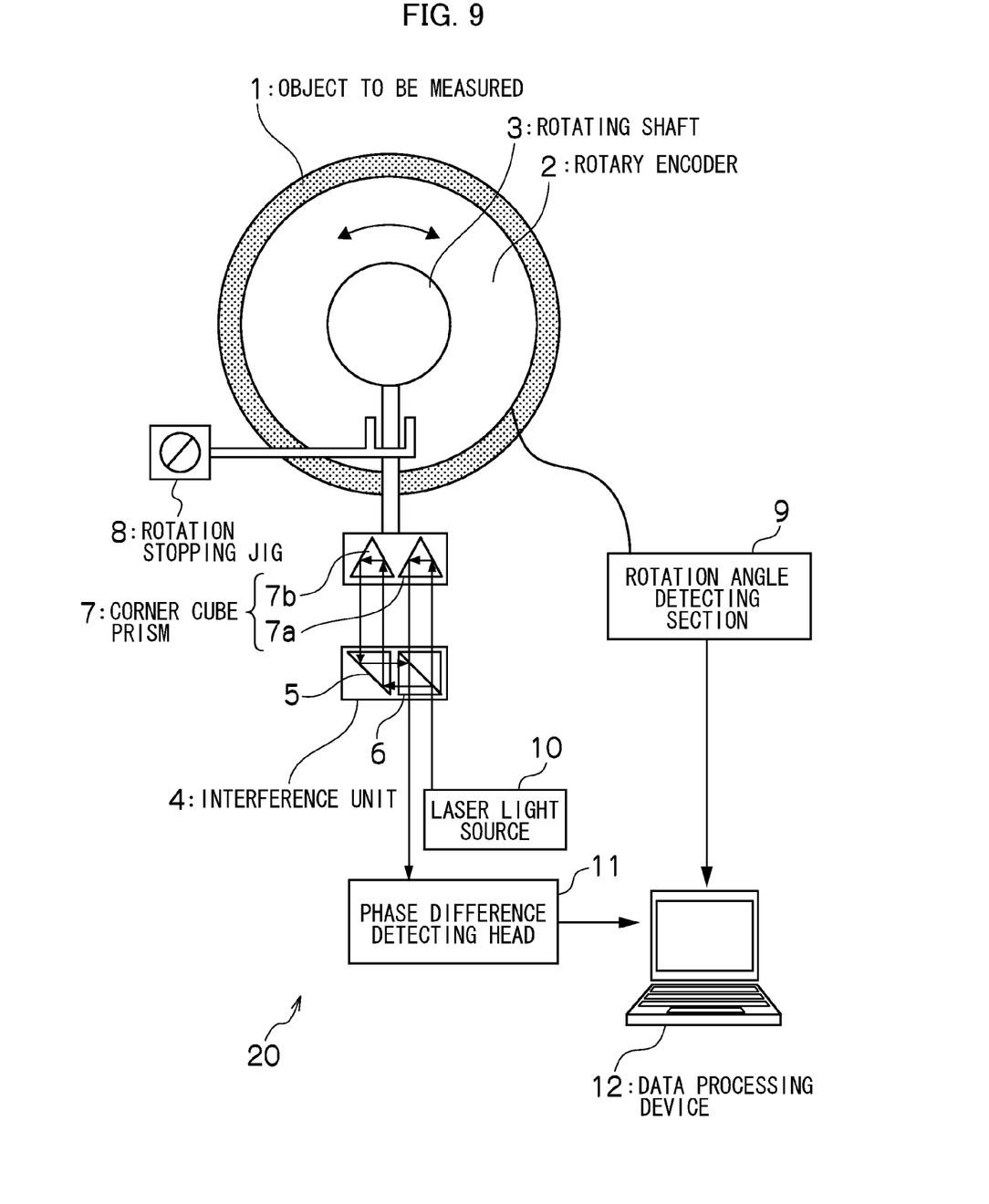
FIG. 9 is a view of the overall configuration of an example of an angle measuring system according to a second embodiment.

FIG. 9 is a view of the overall configuration of an example of an angle measuring system according to a second embodiment. The same components in FIG. 9 as those of the first embodiment shown in FIGS. 1 to 8 are designated by the same reference numerals. A description of the matters described in the first embodiment will be omitted, and differences from the first embodiment will be mainly described below.

As shown in FIG. 2, the rotating shaft 3 of the rotary encoder 2 is attached to the rotating shaft 1a of the object 1 to be measured in the first embodiment. In contrast, as shown in FIG. 10, an encoder body 2a is attached to a rotating shaft 1a of an object 1 to be measured.

Figure 10:
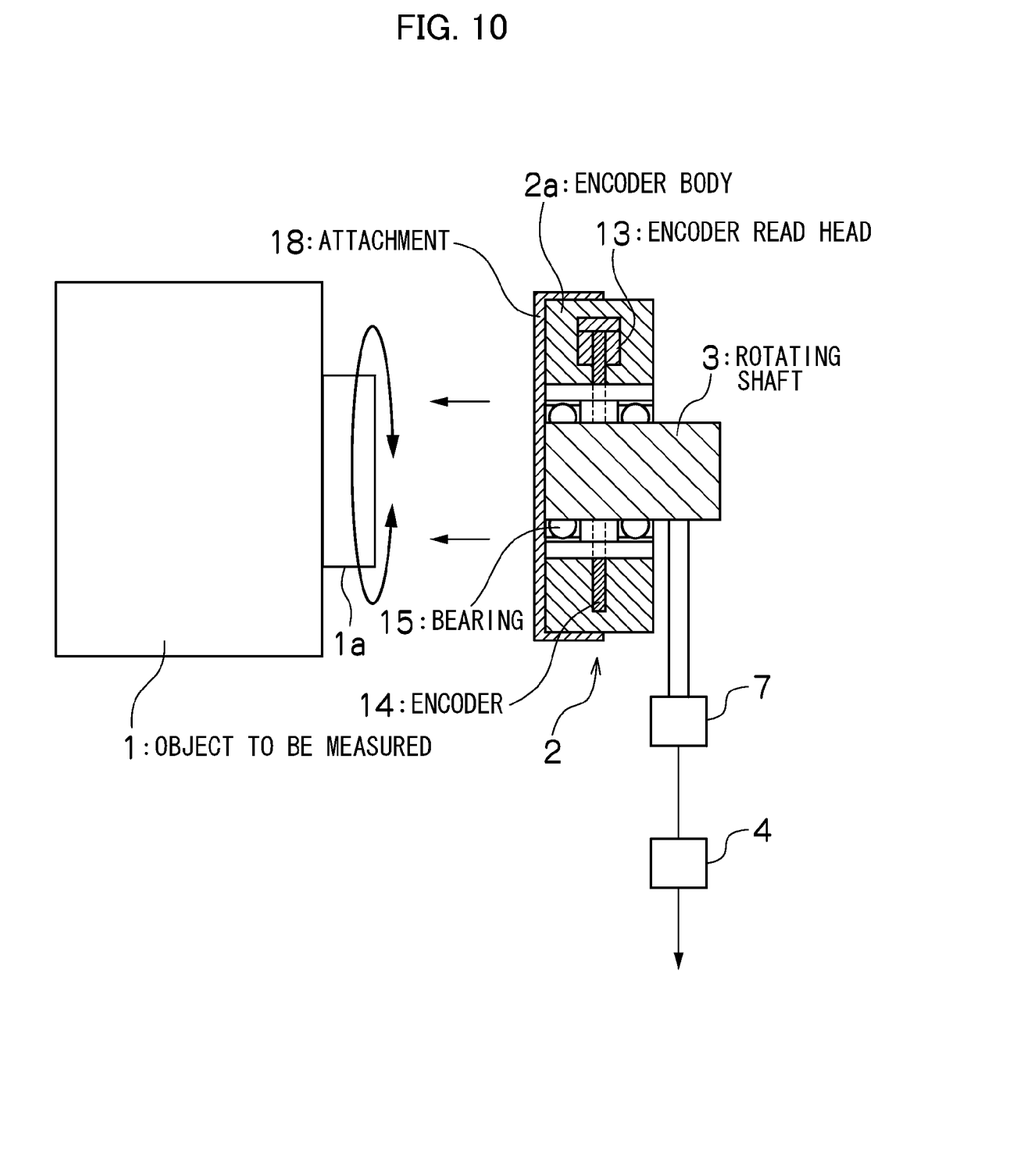
FIG. 10 is a side view showing how an encoder body is attached to an object to be measured which is rotationally driven.

In FIG. 10, an attachment 18 is an intervening member for attaching the encoder body 2a to the rotating shaft 1a of the object 1 to be measured and protects a rotating shaft 3 of a rotary encoder 2 such that the rotating shaft 3 of the rotary encoder 2 is not much affected by rotation of the rotating shaft 1a of the object 1 to be measured.

A rotation stopping jig 8 according to the present embodiment locks the rotating shaft 3 of the rotary encoder 2 while tolerating motion (displacement) of the rotating shaft 3 of the rotary encoder 2 in an orthogonal plane orthogonal to the rotating shaft 3 of the rotary encoder 2 within a fixed allowance range.

Corner cube prisms 7 (7a and 7b) according to the present embodiment are attached to the rotating shaft 3 of the rotary encoder 2. Like the first embodiment, the corner cube prisms 7 are arranged to directly confront an interference unit 4. Rotational movement of the rotating shaft 3 of the rotary encoder 2 is detected in a non-contact manner using the interference unit 4 and a phase difference detecting head 11.

Unlike the first embodiment, the load of the encoder body 2a is not placed on the rotating shaft 3 in the present embodiment, and the rotating shaft 3 only needs to bear the load of the relative light corner cube prisms 7. Therefore, the rotating shaft 3 and a bearing 15 can be made smaller, and a weight reduction can be achieved. Accordingly, the configuration of the present embodiment is more suitable, depending on the mountable weight of the rotating shaft 1a of the object 1 to be measured. On the other hand, care must be taken to ensure that a cable connected to the encoder body 2a does not wind around the rotary encoder 2 when the encoder body 2a rotates.

In the second embodiment, the encoder body 2a is attached to the rotating shaft 1a of the object 1 to be measured that is rotationally driven, and motion (displacement) of the rotating shaft 3 of the rotary encoder 2 in the orthogonal plane orthogonal to the rotating shaft 3 of the rotary encoder 2 is regulated to within the fixed allowance range so as to tolerate eccentricity of the rotating shaft 1a of the object 1 to be measured from the rotating shaft 3 of the rotary encoder 2. A rotation angle of the encoder body 2a is detected (measured) on the basis of the code read by an encoder read head 13, and an inclination angle of the rotating shaft 3 of the rotary encoder 2 which is changed from a time point when measurement of the rotation angle of the encoder body 2a is started is detected by a non-contact angle detecting device 20. A rotation angle θ1 which is detected (measured) using the rotary encoder 2 is corrected on the basis of a changed inclination angle θ2 of the rotating shaft 3 of the rotary encoder 2 detected by the non-contact angle detecting device 20.

Note that although the above-described first and second embodiments have been described in the context of a case using an optical rotary encoder as a rotary encoder, another rotary encoder such as a magnetic one may be used, of course.

The first and second embodiments have been described in the context of a case where a so-called laser gauge interferometer is used as a non-contact angle detecting device. However, any other detection device can be employed as long as the device can perform angle measurement in a non-contact manner with high accuracy. For example, an autocollimator or a level may be used.

The above-described rotation angle measurement may be dynamic measurement. In an angle measuring method and an angle measuring system according to the present invention, at least one of static measurement, in which the rotation angle is detected when rotation of the rotating shaft 1a of the object 1 to be measured is stopped, and dynamic measurement, in which the rotation angle is detected while the rotating shaft 1a of the object 1 to be measured is rotating, is performed. In dynamic measurement, the non-contact angle detecting device 20 that is used together with the rotary encoder 2 is required to produce an output in real time.

A case where the rotation angle $\theta 1$ is corrected using only the inclination angle $\theta 2$ has been described as an example in order to simply describe the present invention. However, the correction may be performed on the basis of any other measurement value, of course. That is, the present invention is configured such that the rotation angle $\theta 1$ is corrected on the basis of at least the inclination angle $\theta 2$. For example, the amount of eccentricity of the rotating shaft 1a of the object 1 to be measured from the rotating shaft 3 of the rotary encoder 2 is detected, and the rotation angle $\theta 1$ is corrected on the basis of the detected amount of eccentricity and the inclination angle $\theta 2$.

An object to be measured is not limited to the shapes shown in the drawings. For example, the object to be measured may be in the shape of a disc. A rotating shaft of an object to be measured to which the rotary encoder 2 is to be attached need not be a shaft-like one which is specially formed. For example, a rotation center of an object to be measured may be set as a rotating shaft of the object to be measured, and a rotary encoder may be attached to the rotation center.

The present invention is not limited to examples described in the present specification and examples shown in the drawings. It will be appreciated that various design changes and improvements may be made without departing from the spirit of the present invention.

Below are examples of variations of design changes and improvements.

(Variation 1) An angle measuring system comprising:
  a relative angle detecting device which includes: an unactuated rotating body which is freely rotatable in a state where whose rotatable angle is regulated within a predetermined angle range; and an actuated rotating body which is rotatably shaft-supported by the unactuated rotating body and is driven by a driving unit, the relative angle detecting device which detects a relative rotation angle of the actuated rotating body with respect to the unactuated rotating body; and
  an absolute angle detecting device which detects an absolute rotation angle of the unactuated rotating body without contacting to the unactuated rotating body.

(Variation 2) The angle measuring system according to Variation 1, wherein the absolute angle detecting device detects the absolute rotation angle of the unactuated rotating body concurrently with the detection of the relative rotation angle by the relative angle detecting device.

(Variation 3) The angle measuring system according to Variation 1 or Variation 2, further comprising
  a correction device which corrects the rotation angle detected by the relative angle detecting device based on the rotation angle detected by the absolute angle detecting device.

(Variation 4) The angle measuring system according to any one of Variation 1 to Variation 3, wherein the relative angle detecting device is a rotary encoder.

(Variation 5) The angle measuring system according to any one of Variation 1 to Variation 4, wherein the absolute angle detecting device is a one which uses a laser interferometer.

(Variation 6) The angle measuring system according to any one of Variation 1 to Variation 5, further comprising
  a regulation member which regulates the absolute rotation angle of the unactuated rotating body within a certain range.

(Variation 7) The angle measuring system according to Variation 6, wherein the regulation member includes a weight member which urges a reference position of the unactuated rotating body downward in a gravity direction.

(Variation 8) An angle measuring method using a rotary encoder comprising:
  a relative angle detecting step of detecting a relative rotation angle of an actuated rotating body with respect to an unactuated rotating body which is freely rotatable in a state where whose rotatable angle is regulated within a predetermined angle range, the actuated rotating body which is rotatably shaft-supported by the unactuated rotating body and is driven by a driving unit; and
  an absolute angle detecting step of detecting an absolute rotation angle of the unactuated rotating body without contacting to the unactuated rotating body.

(Variation 9) The angle measuring method according to Variation 8, wherein at the absolute angle detecting step, the absolute rotation angle of the unactuated rotating body is detected concurrently with the detection of the relative rotation angle at the relative angle detecting step.

(Variation 10) The angle measuring method according to Variation 8 or Variation 9, further comprising
  a correction step of correcting the rotation angle detected at the relative angle detecting step based on the rotation angle detected at the absolute angle detecting step.

(Variation A1) An angle measuring system comprising:
  a relative angle detecting device which includes: a support reference body whose rotation is limited to within a certain range; and an actuated rotating body which is shaft-supported so as to be entire-circumferentially rotatable with respect to the support reference body, the relative angle detecting device which continuously detects a relative rotation angle of the rotating body with respect to the support reference body; and
  an optical angle detecting device which optically detects a rotation angle of the support reference body separately from the rotating body and the support reference body.

(Variation A2) The angle measuring system according to Variation A1, wherein the optical angle detecting device detects the rotation angle of the support reference body concurrently with the detection of the relative rotation angle by the relative angle detecting device.

(Variation A3) The angle measuring system according to Variation A1 or Variation A2, further comprising
  a correction device which corrects the rotation angle detected by the relative angle detecting device based on the rotation angle detected by the optical angle detecting device.

(Variation A4) The angle measuring system according to any one of Variation A1 to Variation A3, wherein the relative angle detecting device is a rotary encoder.

(Variation A5) The angle measuring system according to any one of Variation A1 to Variation A4, wherein the optical angle detecting device is a one which uses a laser interferometer.

(Variation A6) The angle measuring system according to any one of Variation A1 to Variation A5, further comprising
a regulation member which regulates the rotation angle of the support reference body within a certain range.

(Variation A7) The angle measuring system according to Variation A6, wherein the regulation member includes a weight member which urges a reference position of the support reference body downward in a gravity direction.

(Variation A8) An angle measuring method comprising:
a relative angle detecting step of detecting a relative rotation angle between a support reference body whose rotation is limited to within a certain range and an actuated rotating body which is shaft-supported so as to be entire-circumferentially rotatable with respect to the support reference body;
an optical angle detecting step of optically detecting a rotation angle of the support reference body separately from the rotating body and the support reference body.

(Variation A9) The angle measuring method according to Variation A8, wherein at the optical angle detecting step, the rotation angle of the support reference body is detected concurrently with the detection of the relative rotation angle at the relative angle detecting step.

(Variation A10) The angle measuring method according to Variation A8 or Variation A9, further comprising
a correction step of correcting the rotation angle detected at the relative angle detecting step based on the rotation angle detected at the optical angle detecting step.

(Variation B1) An angle measuring system comprising:
a rotary encoder which detects a relative rotation angle of a rotating body with respect to a reference body;
a laser interferometric detecting device which detects a rotation angle of the reference body separately from the reference body and the rotating body.

(Variation B2) The angle measuring system according to Variation B1, wherein the laser interferometric detecting device detects the rotation angle of the reference body concurrently with the detection of the relative rotation angle by the rotary encoder.

(Variation B3) The angle measuring system according to Variation B1 or Variation B2, further comprising
a correction device which corrects the relative rotation angle detected by the rotary encoder based on the rotation angle detected by the laser inteferometric detecting device.

(Variation B4) The angle measuring system according to any one of Variation B1 to Variation B3, further comprising
a regulation member which regulates the rotation angle of the reference body within a certain range.

(Variation B5) The angle measuring system according to Variation B4, wherein the regulation member includes a weight member which urges a reference position of the reference body downward in a gravity direction.

(Variation B6) An angle measuring method for an angle measuring system including a rotary encoder which detects a relative rotation angle of a rotating body with respect to a reference body and a laser interferometric detecting device which detects a rotation angle of the reference body separately from the reference body and the rotating body, the angle measuring method comprising:
a first detecting step of detecting the relative rotation angle of the rotating body with respect to the reference body by the rotary encoder;
a second detecting step of detecting the rotation angle of the reference body by the laser interferometric detecting device.

(Variation B7) The angle measuring method according to Variation B6, wherein at the second detecting step, the rotation angle of the reference body is detected concurrently with the detection of the relative rotation angle at the first detecting step.

(Variation B8) The angle measuring method according to Variation B6 or Variation B7, further comprising
a correction step of correcting the rotation angle detected at the first detecting step based on the rotation angle detected at the second detecting step.

What is claimed is:

1. A rotation angle measuring system comprising:
a rotary encoder configured to detect a relative rotation angle between a reference body and a rotationally driven rotating body which is configured rotatably with respect to the reference body, with reference to the reference body; and
a laser interferometric detecting device configured to optically detect a rotation angle of the reference body from a stationary position separated from the reference body and the rotationally driven rotating body.

2. The rotation angle measuring system according to claim 1, wherein
the rotating body is configured all-round rotatably with respect to the reference body, and
the rotary encoder continuously detects the relative rotation angle of the rotating body with reference to the reference body.

3. The rotation angle measuring system according to claim 1, wherein the laser interferometric detecting device detects the rotation angle of the reference body concurrently with the detection of the relative rotation angle by the rotary encoder.

4. The rotation angle measuring system according to claim 1, further comprising
a correction device configured to correct the rotation angle detected by the rotary encoder based on the rotation angle detected by the laser interferometric detecting device.

5. The rotation angle measuring system according to claim 1, wherein the laser interferometric detecting device is a laser interferometric detecting device configured to optically detect the rotation angle of the reference body using laser interference.

6. The rotation angle measuring system according to claim 1, further comprising
a regulation member configured to regulate the rotation angle of the reference body within a fixed range.

7. The rotation angle measuring system according to claim 6, wherein the regulation member includes a weight member which urges a reference position of the reference body vertically downward.

* * * * *